United States Patent
Chaugule et al.

(10) Patent No.: US 11,012,852 B2
(45) Date of Patent: May 18, 2021

(54) CELLULAR SERVICE ACCOUNT TRANSFER ERROR RECOVERY MECHANISMS

(71) Applicant: Apple Inc., Cupertino, CA (US)

(72) Inventors: Raj S. Chaugule, Santa Clara, CA (US); Anish Kumar Goyal, Milpitas, CA (US); Keizo Marui, Cupertino, CA (US); Li Li, Los Altos, CA (US); Vitalii Kramar, Mountain View, CA (US); Zexing Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/667,634

(22) Filed: Oct. 29, 2019

(65) Prior Publication Data
US 2020/0137558 A1   Apr. 30, 2020

Related U.S. Application Data

(60) Provisional application No. 62/855,771, filed on May 31, 2019, provisional application No. 62/752,298, filed on Oct. 29, 2018.

(51) Int. Cl.
| | |
|---|---|
| *H04W 8/24* | (2009.01) |
| *H04L 29/08* | (2006.01) |
| *H04W 12/08* | (2021.01) |
| *H04W 12/06* | (2021.01) |
| *H04W 12/40* | (2021.01) |

(52) U.S. Cl.
CPC ............ *H04W 8/24* (2013.01); *H04L 67/26* (2013.01); *H04W 12/06* (2013.01); *H04W 12/08* (2013.01); *H04W 12/40* (2021.01)

(58) Field of Classification Search
CPC ....... H04W 12/08; H04W 12/06; H04W 8/24; H04L 67/26
See application file for complete search history.

(56) References Cited

U.S. PATENT DOCUMENTS

| | | | |
|---|---|---|---|
| 10,652,739 B1* | 5/2020 | Lilley | H04W 4/20 |
| 2008/0162666 A1* | 7/2008 | Ebihara | H04L 67/14 |
| | | | 709/217 |
| 2017/0048645 A1* | 2/2017 | Yerrabommanahalli | |
| | | | H04W 8/205 |
| 2018/0367984 A1* | 12/2018 | Park | H04W 12/0023 |
| 2020/0008049 A1* | 1/2020 | Namiranian | H04W 12/001 |
| 2020/0193749 A1* | 6/2020 | Link, II | H04L 63/0853 |

* cited by examiner

*Primary Examiner* — Dai Phuong
(74) *Attorney, Agent, or Firm* — Dickinson Wright RLLP

(57) ABSTRACT

Embodiments described herein relate to mechanisms for error recovery during transfer of cellular service credentials between two mobile wireless devices. Transfer of credentials includes communication between a source device, a target device, and/or one more network-based servers. Authentication can be based on one or more tokens obtained by the source device and provided to the target device. Error recovery can include using redirection to different servers, providing alternative information for authentication, and storage and subsequent retrieval of information to restart or complete a credential transfer process.

20 Claims, 14 Drawing Sheets

CELLULAR SERVICE ACCOUNT TRANSFER ERROR RECOVERY MECHANISMS

CROSS-REFERENCE TO RELATED APPLICATIONS

This application claims the benefit of U.S. Provisional Application No. 62/855,771, entitled "CELLULAR SERVICE ACCOUNT TRANSFER ERROR RECOVERY MECHANISMS," filed May 31, 2019, and also claims the benefit of U.S. Provisional Application No. 62/752,298, entitled "CELLULAR SERVICE ACCOUNT TRANSFER AND AUTHENTICATION," filed Oct. 29, 2018, the contents of both of which are incorporated by reference herein in their entireties for all purposes.

FIELD

The described embodiments relate to wireless communications, including mechanisms to recover from errors during a transfer of cellular service account credentials for cellular wireless services, such as cellular voice and data services authorized by subscriber identity modules (SIMs) and/or electronic SIM (eSIMs), between wireless devices.

BACKGROUND

Newer generation, e.g., fourth generation (4G) and fifth generation (5G), cellular wireless networks employing newer radio access technology that implements one or more $3^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services for both voice and data in parallel. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC for access to different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). A user can transfer cellular service accounts associated with one or more SIMs/eSIMs between wireless devices, such as when changing between different wireless devices or when purchasing and configuring a new wireless device to replace an older wireless device. There exists a need for mechanisms to transfer cellular service account credentials associated with SIMs/eSIMs between wireless devices, including recovering from various error conditions that may occur during a transfer process.

SUMMARY

This Application describes various embodiments that relate to wireless communications, including mechanisms to recover from errors during a transfer of cellular service account credentials for cellular wireless services, such as cellular voice and data services authorized by subscriber identity modules (SIMs) and/or electronic SIM (eSIMs), between wireless devices.

Transfer of cellular service credentials can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of cellular service credentials can also occur via an online network-based service, such as via an iCloud® service, where the devices need not be in proximity to each other. Cellular service account transfer and authentication procedures can be based at least in part on proving authorization to transfer using a transfer token and a trust flag provided directly, e.g., via a peer-to-peer WPAN or WLAN connection when two devices are within proximity to each other, or indirectly, e.g., via a common shared network-based cloud service account, when the two devices are not connected to each other directly. Transfer of certain credentials may require interaction with one or more network-based servers, such as MNO managed servers and/or third-party managed servers. Error conditions may occur during transfer of some credentials that require additional time to recover from, such as when a device crashes during the credential transfer process and/or a user inadvertently (or purposefully) aborts a credential transfer process. Credentials can be transferred in part and listed as pending cellular service plans under a settings menu from which a user of the target device can complete installation and/or cause deletion of the one or more credentials. Some credentials may require redirecting the user to interact with a particular MNO server, such as a web-sheet server, in order to transfer the credentials from the source device to the target device. When additional processing is required, the transfer process may create pending credential transfers during an initial setup phase for the target device to allow for subsequent completion of the pending credential transfers. Status and information required to complete transfer of credentials can be stored in the target device during the initial transfer process for further use later to complete transfer and/or to delete credentials from the target device. Pending plans on a target device are associated with unique identifiers, e.g., integrated circuit card identifiers (ICCIDs) that are expected to be installed on the target device for successful transfer of the profile (eSIM) to the target device. When a target ICCID for a pending plan is installed on the target device, a clear pending plan routine can execute on the target device to clear the status of the pending plan.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Figure 1:
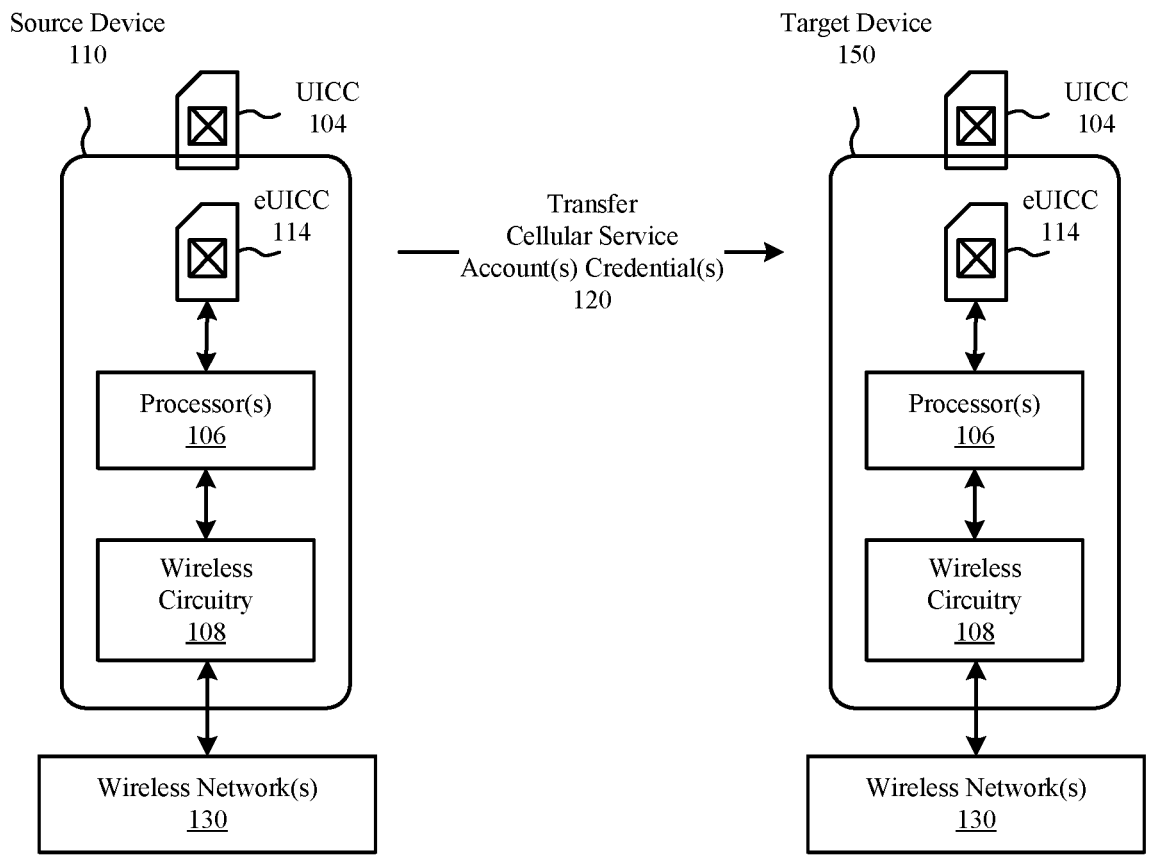
FIG. 1 illustrates a diagram of an exemplary transfer of cellular service account credentials for access to cellular services from a source device to a target device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capability continues to be incorporated into a broad array of electronic devices, including mobile phones, tablets, portable computers, wearable devices, automobiles, etc. Additionally, credentials for access to cellular wireless services are evolving from removable secure cards, also referred to as subscriber identity module (SIM) cards, to include electronic SIMs (eSIMs) that can be installed and updated dynamically on secure system boards, such as embedded Universal Integrated Circuit Cards (eUICCs). A user can own and use multiple different electronic devices that each have cellular wireless service capabilities and can seek to re-use cellular service features and/or settings across multiple cellular-capable electronic devices. For example, when acquiring a new cellular-capable electronic device, a user can seek to transfer cellular credentials from an existing device to the new device in as flexible and efficient a manner as possible. Transfer of cellular credentials between devices when initializing a new device can encounter error conditions that require additional error handling to transfer successfully. As such, this Application describes cellular service account transfer error recovery mechanisms that can be used to move credentials successfully between devices under various scenarios, including when error conditions occur.

A user can seek to transfer credentials from a first device, which can be referred to as a source device, to a second device, which can be referred to as a target device. The user can be associated with a common user account, e.g., an Apple ID maintained by a network-based online cloud service, e.g., iCloud®, and can register each of the source device and the target device with the same user account. The user can seek to transfer credentials from a physical SIM card, e.g., a 4FF card, of the source device to an eUICC of the target device. Alternatively, and/or additionally, the user can seek to transfer credentials in the form of an eSIM included in an eUICC of a source device to an eUICC of a target device. Devices that include an eUICC can usually support multiple eSIMs, and in some instances, the user can seek to transfer a set of one or more eSIMs from a source device to a target device. Some devices can also include one or more removable SIM cards and one or more eSIMs on an eUICC of the device, and the user can seek to transfer a set of some or all credentials from the SIM card(s) and/or a set of some or all eSIMs from the eUICC of the device to another device.

Transfer of credentials can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of credentials can also occur via an online network-based cloud service, such as via an iCloud service, where the devices need not be in proximity to each other. In either case, transfer of credentials can include communication between the source device, the target device, and/or one or more network-based servers, which can include mobile network operator (MNO) managed servers, such as an entitlement server, a web-sheet server, an authentication server, a provisioning server, a subscription management data preparation (SMDP+) server, a home subscriber server (HSS), a billing services server (BSS), and/or an authentication server, as well as third-party managed servers, such as a cloud service server, a push notification services server, a discovery service server, and/or an identification services server.

To reduce time to initially set up a new (target) device, transfer of some credentials from an old (source) device can be postponed and/or only partially completed during the setup phase and accomplished and/or subsequently completed after the setup phase. Transfer of certain credentials may require interaction with one or more network-based servers, such as MNO managed servers and/or third-party managed servers. Error conditions may also occur during transfer of some credentials that require additional time to recover from, such as when a device crashes during the credential transfer process and/or a user inadvertently (or purposefully) aborts the credential transfer process. One or more credentials can be transferred in part and listed as pending cellular service plans under a settings menu from which a user of the target device can complete installation and/or cause deletion of the one or more credentials. Certain credentials may be non-transferable and applicable error messages can be presented. Other credentials may require redirecting the user to interact with a particular MNO server, such as a web-sheet server, in order to transfer the credentials from the source device to the target device. When additional processing is required, the transfer process may create pending credential transfers during an initial setup phase for the target device to allow for subsequent completion of the pending credential transfers. Status and information required to complete transfer of credentials can be stored in the target device during the initial transfer process for further use later to complete transfer and/or to delete credentials from the target device. Pending plans on a target device are associated with unique identifiers, e.g., integrated circuit card identifiers (ICCIDs) that are expected to be installed on the target device for successful transfer of the profile (eSIM) to the target device. When a target ICCID for a pending plan is installed on the target device, a clear pending plan routine can execute on the target device to clear the status of the pending plan.

These and other embodiments are discussed below with reference to FIGS. 1 through 6; however, those skilled in the art will readily appreciate that the detailed description given herein with respect to these figures is for explanatory purposes only and should not be construed as limiting.

FIG. 1 illustrates a diagram 100 of an exemplary transfer 120 of credentials for cellular services from a source device 110 to a target device 150 where the source device 110 and the target device 150 may be within proximity of each other to establish a direct secure connection between them or may be separated by a distance where transfer occurs via an indirect connection, such as over a wireless local area network (WLAN) and/or via one or more cellular wireless networks 130. Transfer of credentials that permit access to services of cellular wireless networks 130 is referred to herein generally regarding transfer of one or more virtual credentials, such as one or more electronic subscriber identity modules (eSIMs), also referred to as profiles or plans herein, from the source device 110 to the target device 150. The eSIMs may be initially present on the UICC 104 and/or the eUICC 114 of the source device 110, and a user may seek to transfer one or more of the eSIMs from the source device 110 to the UICC 104 and/or to the eUICC 114 of the target device 150. The eSIMs may be associated with one or more cellular service accounts for one or more cellular service providers, also referred to as mobile network operators (MNOs). Transfer of one or more eSIMs occurs without requiring the user to remove the UICC 104 of the source device 110 or replace the UICC 104 of the target device 150. As illustrated, the source device 110 and the target device 150 can each include one or more processors 106 and wireless circuitry 108 that can be used to communicate with one or more wireless networks 130. The eSIMs that are transferred can allow the target device 150 to access cellular services for one or more cellular wireless networks that previously were accessible by the source device 110.

Figure 2:
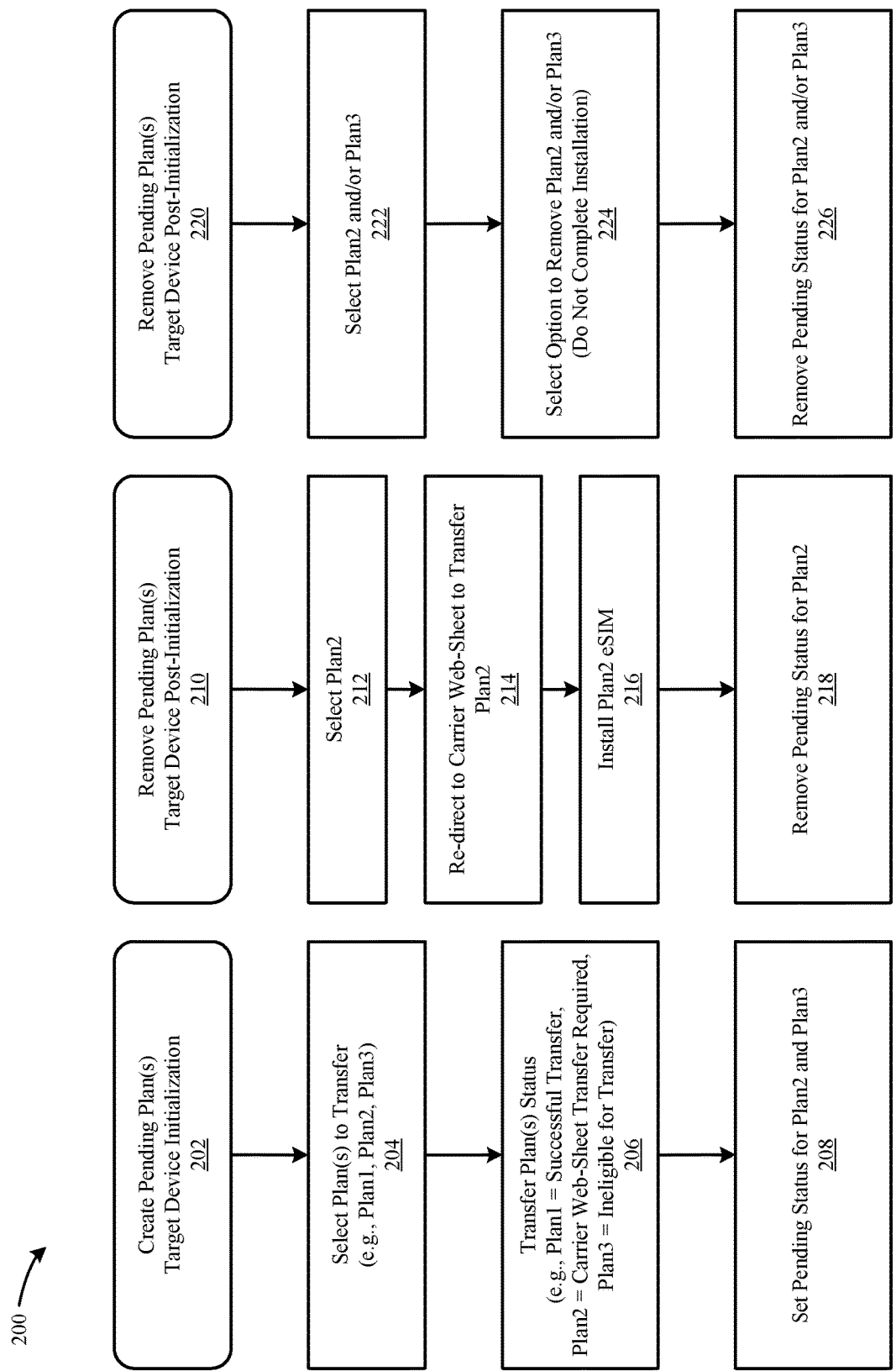
FIG. 2 illustrates a diagram of exemplary actions during initialization and post-initialization phases when transferring cellular service account credentials from a source device to a target device, according to some embodiments.

FIG. 2 illustrates a diagram 200 of actions that can occur during an initialization (setup) phase 202 for the target device 150 when transferring eSIMs (also referred to herein as profiles and/or plans) from the source device 110 to the target device 150, particularly for eSIMs that transfer in part but for which additional actions are required for completion of a transfer. A partially transferred eSIM (plan) can be referred to as a pending plan. The diagram 200 also illustrates actions that can occur post-initialization 210/220 at the target device 150 to address eSIMs (plans) for which transfer during the initialization phase resulted in a pending (not complete) status for transfer of the eSIM. During initialization of the target device 150, at 204, a user selects one or more eSIMs (plans) to transfer from the source device 110 to the target device 150. At 206, a transfer status for each of the one or more eSIMs can be determined. Example transfer statuses for an eSIM can include (i) a successful transfer, such as indicated for a first eSIM (plan1), (ii) an incomplete transfer in which interaction via an MNO (carrier) web-sheet server is required to complete the transfer, such as indicated for a second eSIM (plan2), and/or (iii) an indication that a particular eSIM is ineligible for transfer to the target device 150, such as indicated for a third eSIM (plan3). At 208, status values for eSIMs with incomplete or ineligible transfers are stored, such as in a settings menu of the target device 150, for subsequent access.

During a post-initialization phase 210 at the target device 150, a user can access status for eSIMs such as via a settings menu. At 212, an eSIM with a pending status, e.g., Plan2, can be selected via the settings menu, and, as the pending status indicates the eSIM requires interaction with a carrier (MNO) web-sheet server to complete transfer of the eSIM, the user can be redirected at 214 to the carrier (MNO) web-sheet server with which information as required to complete transfer of the eSIM can be provided. At 216, the eSIM can be successfully installed in the target device 150, e.g., by downloading the eSIM (profile) from an SMDP+ of the applicable cellular wireless services carrier (MNO). Upon successful installation of the eSIM at the target device 150, at 218, the pending status for the eSIM (i.e., for Plan2) can be removed.

Alternatively, during a post-initialization phase 220 at the target device 150, a user can access status for eSIMs, such as via a settings menu, and the user can select, at 222, one or more eSIMs, e.g., Plan2 and/or Plan3. At 224, the user can select an option to not complete transfer of the one or more eSIMs, e.g., to remove the one or more eSIMs from the target device 150. Upon successful removal, at 226, the pending status for the one or more eSIMs can be removed. Thus, a user can choose to complete a transfer for an eSIM that is pending, as shown for post-initialization phase 210, and/or can opt to delete a partially transferred eSIM that is pending, as shown for post-initialization phase 220.

Figure 3:
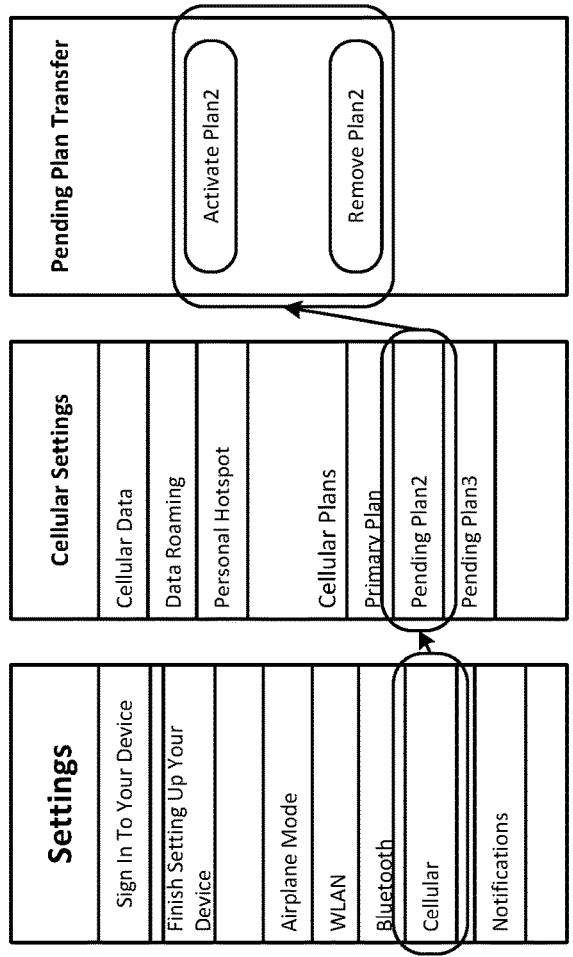
FIG. 3 illustrates a diagram of an exemplary display of information at a target device during a cellular service account transfer, according to some embodiments.

FIG. 3 illustrates a diagram 300 of an exemplary display of information by which a user of the target device 150 can access status for eSIMs that correspond to cellular wireless service plans. Via a settings menu, the user can access cellular settings for the target device 150, which can display a set of eSIMs (plans) that are installed or pending (partially installed, in process, but incomplete) at the target device 150. Upon selection of a pending eSIM (plan), the user can select whether to activate (complete transfer) of the pending eSIM or to remove the pending eSIM from the target device 150.

Figure 4:
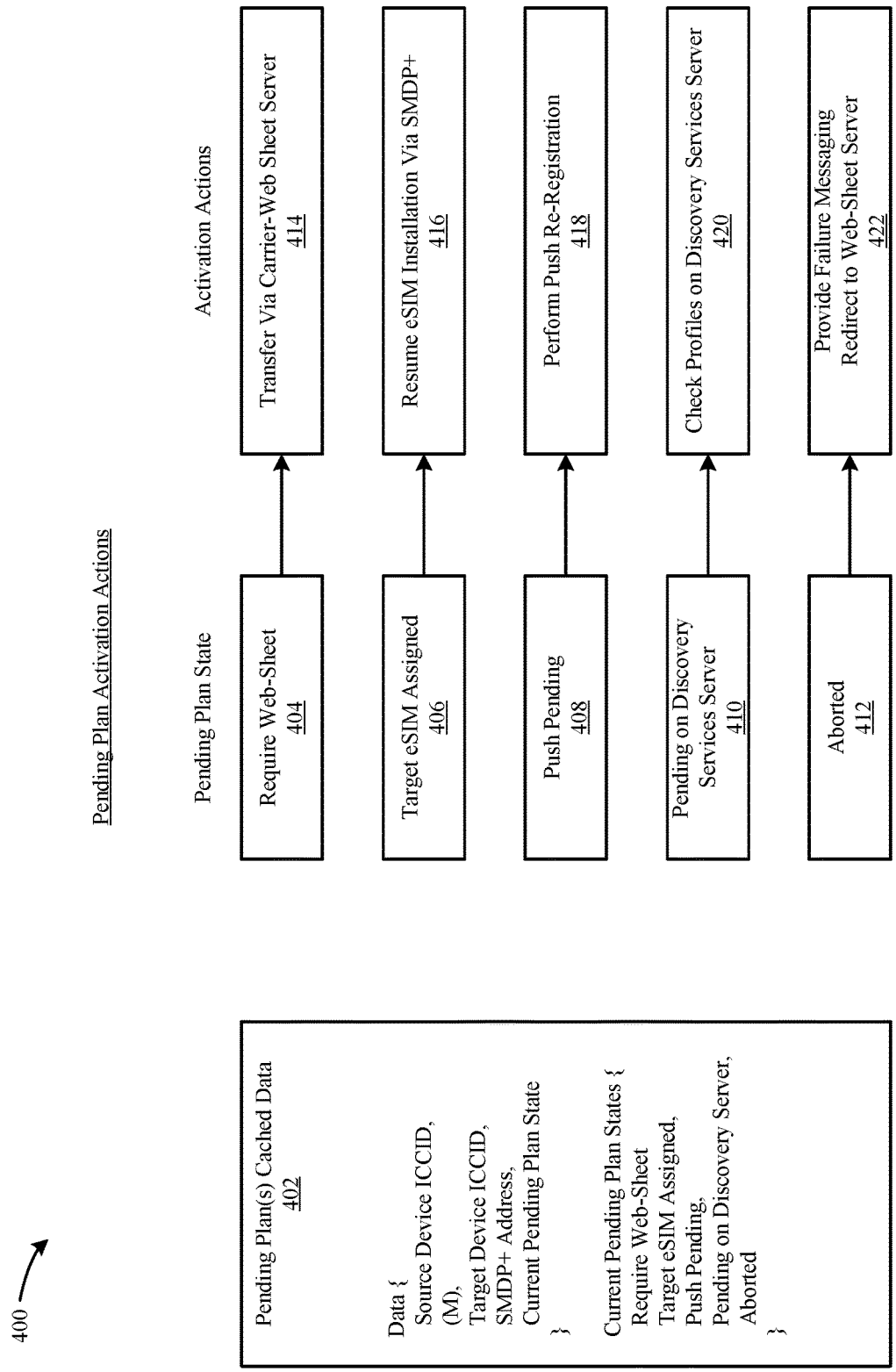
FIG. 4 illustrates a diagram of exemplary data structures and various state/action pairs for cellular service account plan activation, according to some embodiments.

FIG. 4 illustrates a diagram 400 of data structures 402 that can be stored (cached) for a pending eSIM (plan) as well as various states (statuses) for a pending plan that can require additional actions to complete activation of the plan. For each pending plan, the target device 150 can store data information including an integrated circuit card identifier (ICCID) associated with the plan (eSIM) for the source device 110 from which the pending plan was transferred, an ICCID associated with the plan (eSIM) for the target device 150, a universal resource locator (URL) internet address for an network-based SMDP+ server from which a profile (eSIM) can be downloaded, and a current pending state of the pending plan. Representative states (statuses) for pending plans can include (i) require web-sheet (server interaction to complete transfer of the plan), (ii) whether a target eSIM has been assigned for the target device 150, (iii) whether a push notification from a push notifications server is pending (not yet received by the target device 150), (iv) require discovery server (interaction to complete transfer of the plan), or (v) aborted (e.g., due to ineligibility for the plan to transfer to the target device 150 and/or due to incompatibility of the plan with the target device 150).

For each pending state (status), certain actions can occur to complete transfer of the plan to the target device 150 and/or to remove the plan from the target device 150. For a pending plan state 404 in which a pending plan requires interaction with a carrier-based (MNO-based) web-sheet server, additional actions to complete activation of the plan can include, at 414, transfer of the user to the carrier-based web sheet server to enter information and/or to provide credentials for authorization to transfer the plan to the target device 150. For a pending plan state 406 in which a target eSIM has been assigned but not yet been downloaded to the target device 150, at 416, the target device 150 can resume transfer to install the target eSIM from the applicable SMDP+. For a pending plan state 408 in which a push notification is pending (not yet received by the target device 150), the target device 150, at 418, can perform a push re-registration process with a push notification services server to continue activation of the pending plan (eSIM). For a pending plan state 410 in which a pending plan requires interaction with a discovery services server, the target device 150, at 420, can check for an eSIM (profile) available from the discovery services server. For a pending plan state 412 in which transfer of a plan was aborted during initialization of the target device 150, at 422, failure messages can be provided via a display of the target device 150, and a user of the target device 150 can be re-directed to an applicable carrier-based (MNO-based) web sheet server to complete (or halt) transfer of the pending plan (eSIM).

FIGS. 5A through 5I illustrate error recovery mechanisms for several error conditions that can occur during transfer of an eSIM, resulting in a pending plan (eSIM) at the target device 150, and exemplary error recovery actions that can be undertaken to complete transfer of the eSIM to the target device 150.

Figure 5A:
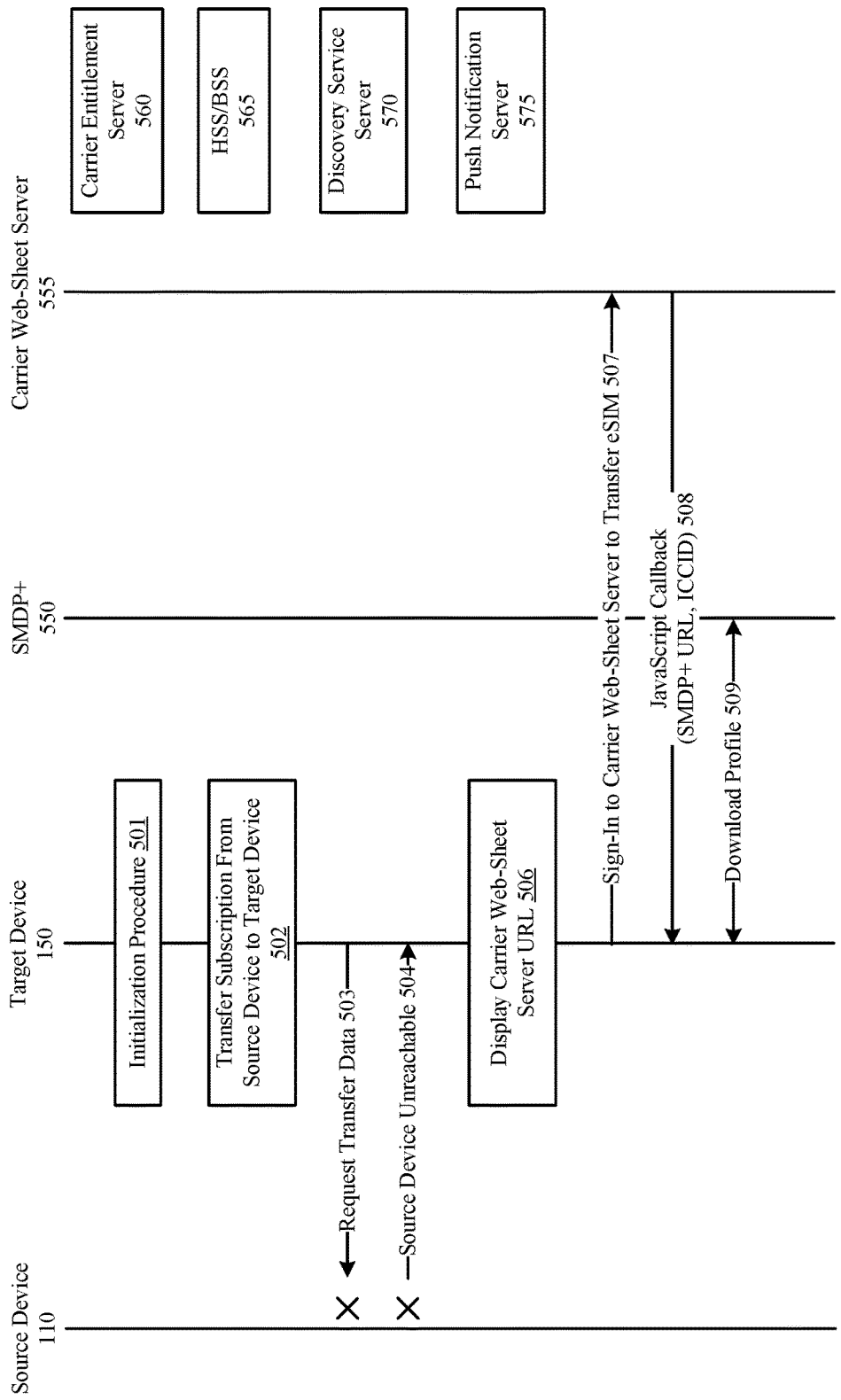
FIGS. 5A through 5I illustrate diagrams of exemplary error recovery actions in response to various error conditions that may occur during transfer of cellular service account credentials, according to some embodiments.

FIG. 5A illustrates a diagram 500 that includes error recovery actions to take when a source device 110 is unreachable by the target device 150 during transfer of a plan (eSIM) from the source device 110 to the target device 150. During eSIM transfer, authentication by the target device 150 for transfer of the eSIM from the source device 110 can be based on a transfer token obtained by the source device 110 from a carrier (MNO) entitlement server 560 and provided to the target device 150. The eSIM allows the source device 110 to authenticate with a cellular wireless network and access cellular wireless network services provided by the MNO. Before transferring the eSIM from the source device 110 to the target device 150, the source device 110 obtains the transfer token and provides the transfer token to the target device 150. In some circumstances, however, the source device 110 may be unreachable by the target device 150 and therefore unable to provide the transfer token to the target device 150. In some cases, the source device 110 lacks connectivity or cannot function properly to obtain the transfer token from the carrier entitlement server 560 and/or to communicate the transfer token to the target device 150. When a transfer token is not obtainable by the target device 150, error recovery can include redirection of the target device 150 to a carrier-based web-sheet server 555 in order to allow the target device 150 to provide credentials to authorize transfer of the eSIM from the source device 110 to the target device 150. In some embodiments, a URL (internet address) for the web-sheet server 555 can be included in firmware/software provided to the target device 150 during manufacture and/or during initialization of the target device 150.

As shown in FIG. 5A, the target device 150, at 501, can perform an initialization (setup) procedure and initiate transfer of an eSIM (plan, subscription) from the source device 110 to the target device 150. At 502, the target device 150 can begin a process to transfer a subscription from a source device 110 to the target device 150. The transfer process can be initiated as part of the initialization process for the target device 150 or after the initialization procedure. The target device 150, at 503, can request transfer data from the source device 110, where the transfer data used to transfer the eSIM can include a transfer token obtained by the source device 110 from the carrier entitlement server 560. The source device 110, however at 504, may not respond to the request for the transfer data from the target device 150 and therefore can appear unreachable by the target device 150. Without the transfer token, the target device 150 cannot demonstrate authorization to transfer the eSIM from the source device 110 to the target device 150. The target device 150, at 506, can be re-directed to the carrier web-sheet server 555 associated with the carrier (MNO) for the eSIM to be transferred. An internet (web) address (URL) for the web-sheet server 555 can be pre-stored in the target device 150, such as in a carrier bundle, and allow the target device 150 to access the web-sheet server 555, e.g., via an internet browser application on the target device 150. A carrier bundle can be preloaded in the target device 150 during manufacture and/or during initialization. A carrier bundle can also be updated subsequent to manufacture and/or initialization. A user of the target device 150 can interact with the carrier web-sheet server 555, e.g., at 507, to provide authorization for the request to transfer the eSIM from the source device 110 to the target device 150 by entering user credentials associated with the eSIM. Upon successful authorization, at 508, the carrier web-sheet server 555 can execute a JavaScript (JS) callback mechanism to connect securely with the target device 150, e.g., with the eUICC 114 of the target device 150, and to provide an internet address (URL) for the SMDP+ 550 from which a profile for the eSIM can be downloaded, at 509, by the target device 150. The carrier web-sheet server 555, via the JS callback mechanism at 508, can also provide a unique ICCID to the target device 150 to be associated with the downloaded profile (eSIM).

Figure 5B:
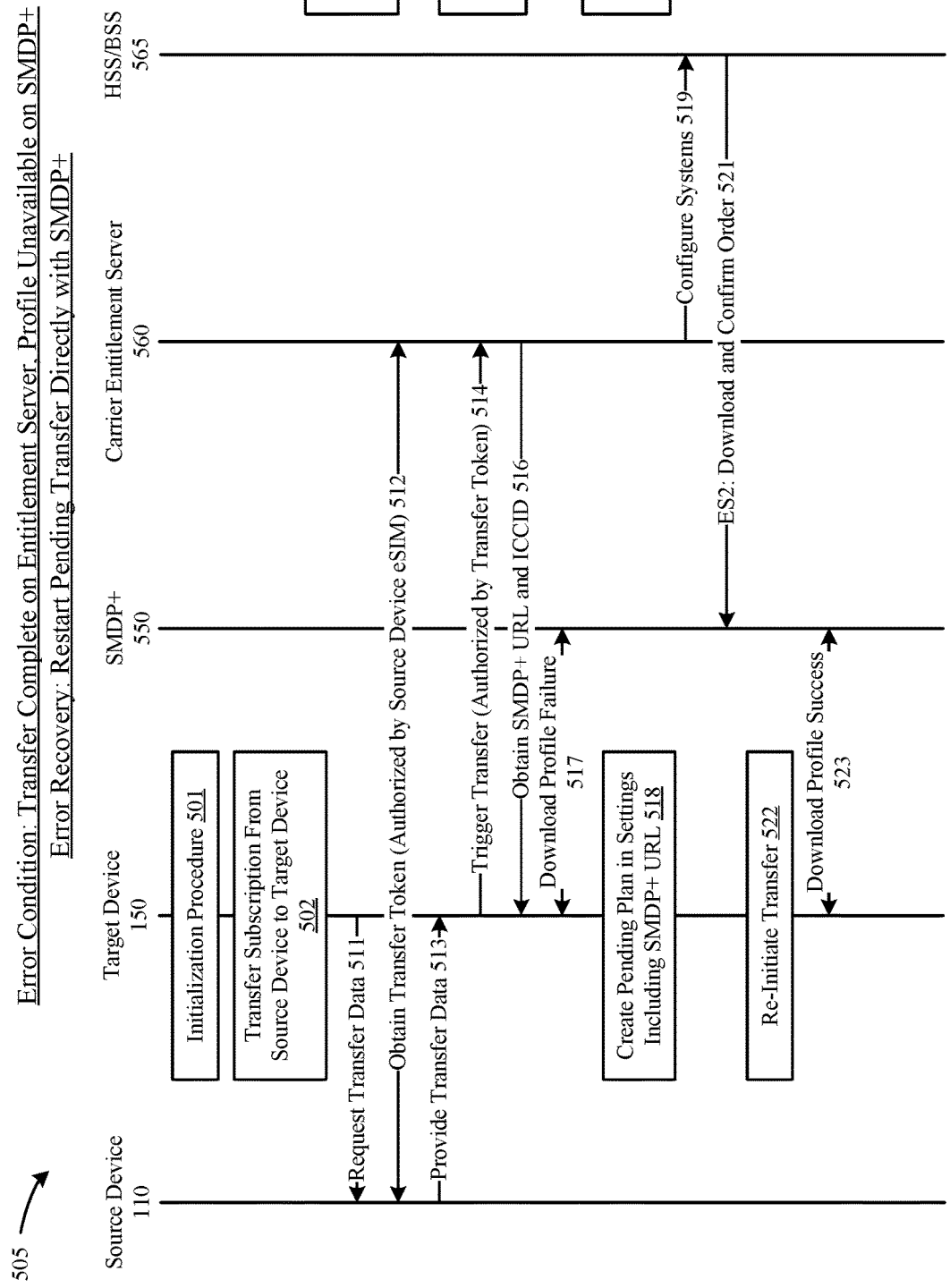

FIG. 5B illustrates a diagram 505 that indicates error recovery actions to take when transfer of an eSIM is authorized and completed on the carrier entitlement server 560, but the associated profile (eSIM) is unavailable for download by the target device 150 from the SMDP+ 550. Transfer of an eSIM (or equivalently of its associated subscription plan) can involve multiple distinct network entities, such as the carrier entitlement server 560, the HSS/BSS 565, and the SMDP+ 550. Propagation of the transfer of the eSIM, via the carrier's internal network back-end systems to provision the eSIM and perform other ES2+ operations on the SMDP+ 550 to assign an eSIM to the target device 150, can take several minutes to complete. If the target device 150 sends a request to the SMDP+ 550 to download the eSIM (profile) from the SMDP+ 550 before the back-end operations complete, the request can be rejected. Moreover, subsequent requests to the carrier entitlement server 560 to transfer the eSIM can be rejected, as the initial request to transfer the eSIM to the target device 150 has been completed, from the perspective of the carrier entitlement server 560. In such circumstances, a deadlock can occur. To account for carrier internal back-end network delay, after receipt of a transfer response from the carrier entitlement server 560, the target device 150 can store (cache) information obtained from the carrier entitlement server 560 for downloading the profile, e.g., the internet address (URL) for the SMDP+ 550. The target device 150 can create a pending status for transfer of the eSIM and can indicate the pending status within a settings menu for cellular services. Responsive to an indication to activate the pending eSIM, e.g., based on an input from a user of the target device 150, provisioning of the eSIM from the SMDP+ 550 can resume using the previously stored information. The target device 150 need not repeat authorization with the carrier entitlement server 560 and can instead directly download the assigned eSIM (profile) from the SMDP+ 550.

As shown in FIG. 5B, at 501, the target device 150 can perform an initialization (setup) procedure and initiate transfer of an eSIM (plan, subscription) from the source device 110 to the target device 150. At 502, the target device 150 can begin a process to transfer a subscription from a source device 110 to the target device 150. The transfer process can be initiated as part of the initialization process for the target device 150 or after the initialization procedure. The target device 150, at 511, can request transfer data from the source device 110, where the transfer data used to transfer the eSIM can include a transfer token obtained by the source device 110 from the carrier entitlement server 560. The source device 110, at 512, can obtain the transfer token from the carrier entitlement server 560, and authorization for transfer of the eSIM can be based at least in part on the source device 110 having the eSIM (installed and operational). The source device 110, at 513, can provide the transfer data to the target device 150 including the transfer token obtained from the carrier entitlement server 560. The target device 150, at 514, can subsequently trigger transfer of the eSIM by interacting with the carrier entitlement server 560, where authorization is provided based on the target device 150 having the transfer token previously provided to the source device 110 by the carrier entitlement server 560. The target device 150, at 516, obtains from the carrier entitlement server 560 a web address (URL) for the SMDP+ 550 from which to download the profile for the transferred eSIM and an ICCID to associate with the (to be downloaded) profile. In some cases, as discussed herein, the profile can be unavailable for download from the SMDP+ 550 when the target device 150 requests the profile, e.g., due to delay for back-end system updates for transfer of the eSIM from the source device 110 to the target device 150, resulting in a failure to download the profile at 517. Upon failure to download the profile from the SMDP+, the target device 150, at 518, creates a pending plan within a set of cellular settings of the target device 150 and stores information for downloading the profile for the pending plan, e.g., the SMDP+ URL, at a future time. The carrier entitlement server 560, at 519, can configure additional back-end systems, such as the HSS/BSS 565, which can send an ES2 message to the SMDP+ 550, at 521, to confirm an order to allow for the profile to be downloaded from the SMDP+ 550 by the target device 150. Subsequently, based on user interaction, at 522, via the cellular settings menu to re-initiate transfer of the pending plan (eSIM), the target device 150 can connect securely to the SMDP+ 550 and download the profile (eSIM) successfully, at 523, using, at least in part, the stored information previously obtained from the carrier entitlement server 560 for downloading the profile (eSIM).

Figure 5C:
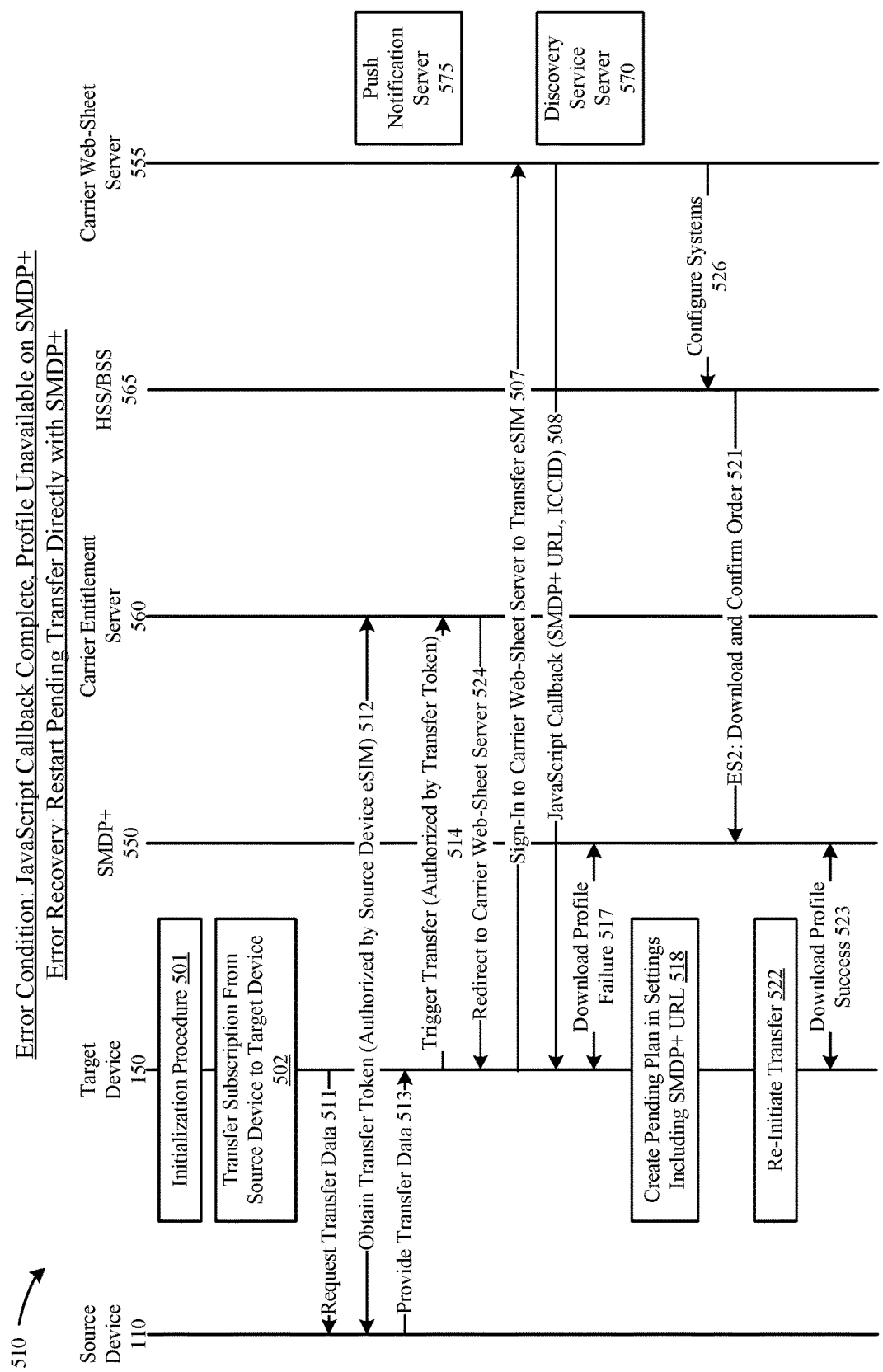

FIG. 5C illustrates a diagram 510 that indicates exemplary error recovery actions to take for another scenario where transfer of an eSIM is authorized and completed on the carrier entitlement server 560, but the associated profile (eSIM) is unavailable for download by the target device 150 from the SMDP+ 550. At 501, the target device 150 can perform an initialization (setup) procedure and initiate transfer of an eSIM (plan, subscription) from the source device 110 to the target device 150. At 502, the target device 150 can begin a process to transfer a subscription from a source device 110 to the target device 150. The transfer process can be initiated as part of the initialization process for the target device 150 or after the initialization procedure. The target device 150, at 511, can request transfer data from the source device 110, where the transfer data used to transfer the eSIM can include a transfer token obtained by the source device 110 from the carrier entitlement server 560. The source device 110, at 512, can obtain the transfer token from the carrier entitlement server 560, and authorization for transfer of the eSIM can be based at least in part on the source device 110 having the eSIM (installed and operational). The source device 110, at 513, can provide the transfer data to the target device 150 including the transfer token obtained from the carrier entitlement server 560. The target device 150, at 514, can subsequently trigger transfer of the eSIM by interacting with the carrier entitlement server 560, where authorization is provided based on the target device 150 having the transfer token previously provided to the source device 110 by the carrier entitlement server 560. The authorization based on the transfer token may be insufficient alone to transfer the eSIM (plan, subscription) from the source device 110, and the target device 150 may be required to provide additional verification or information to the MNO associated with the carrier entitlement server 560, e.g., to a carrier web-sheet server 555. At 524, the target device 150 is directed to the carrier web-sheet server 555 by the carrier entitlement server 560 as part of the process to authorize transfer of the eSIM. The target device 150 can be redirected to the carrier's web-sheet server 555 for various reasons, including based on a policy of the carrier and/or for additional security to authorize transfer of the eSIM from the source device 110 to the target device 150. At 507, the target device 150 can interact with the carrier web-sheet server 555 providing user credentials as required to indicate authorization to transfer the eSIM from the source device 110 to the target device 150. Upon successful authorization, the carrier web-sheet server 555, at 508, can initiate a JavaScript callback to establish a secure connection with the target device 150 and to provide a web address (URL) for the SMDP+ 550 from which the target device 150 can download the eSIM. The carrier web-sheet server 555 can also provide, at 508, an ICCID to be associated with the eSIM to be downloaded to the target device 150. Propagation of authorization via the carrier's back-end systems may not be complete when the target device 150 attempts to download the profile (eSIM) from the SMDP+ 550, and the download of the profile (eSIM) from the SMDP+ 550 can fail as indicated at 517. As with the scenario shown in FIG. 5B, additional requests to the carrier entitlement server 560 for transfer of the eSIM may be rejected. Additional requests to the carrier web-sheet server 555 may also be rejected. To allow for completing transfer of the eSIM at a later time, the target device 150, at 518, creates a pending plan with an applicable status in the carrier settings menu and includes information required to download the profile from the SMDP+ 550, e.g., the web address (URL) for the SMDP+ 550, at a future time. The carrier entitlement server 560, at 519, can configure additional back-end systems, such as the HSS/BSS 565, which can send an ES2 message to the SMDP+ 550, at 521, to confirm an order to allow for the profile to be downloaded from the SMDP+ 550 by the target device 150. Responsive to an indication to activate the pending eSIM, e.g., based on user interaction at 522, provisioning of the eSIM from the SMDP+ 550 can resume using the stored information at 523. The target device 150 need not repeat authorization with the carrier entitlement server 560 or with the carrier web-sheet server 555 and can instead directly download the assigned eSIM (profile) successfully from the SMDP+ 550 at 523. Error recovery mechanisms, when failure to download an eSIM from the SMDP+ 550 occurs as shown in FIG. 5C, can also be used when the target device 150 crashes during an eSIM transfer process. A crash of the target device 150 can occur: (i) after receipt of a response from the carrier entitlement server 560 (FIG. 5B), (ii) after receipt of a JS callback from the carrier web-sheet server 555 (FIG. 5C), (iii) due to a web-sheet user interface (UI) crash after receipt of the JS callback from the carrier web-sheet server 555, (iii) due to reboot of the target device 150 while downloading the profile from the SMDP+ 550, (iv) due to a user inadvertently or intentionally exits a web-sheet user interface (UI) during interaction with the carrier web-sheet server 555, e.g., failing to complete consent to a carrier service agreement, or prior to receipt of the JS callback from the carrier web-sheet server 555. When the target device 150 crashes during the eSIM transfer process before completion of interaction with the web-sheet server 555, the target device 150 can allow for subsequent reconnection to the carrier web-sheet server 555 to complete the interaction required for authorization to download the profile (eSIM).

Error recovery mechanisms, when failure to download an eSIM from the SMDP+ 550 occurs as shown in FIG. 5C, can also be used when the target device 150 crashes during an eSIM transfer process. A crash of the target device 150 can occur: (i) after receipt of a response from the carrier entitlement sever 560 (FIG. 5B), (ii) after receipt of a JS callback from the carrier web-sheet server 555 (FIG. 5C), (iii) due to a web-sheet user interface (UI) crash after receipt of the JS callback from the carrier web-sheet server 555, (iii) due to reboot of the target device 150 while downloading the profile from the SMDP+ 550, (iv) due to a user inadvertently or intentionally exits a web-sheet user interface (UI) during interaction with the carrier web-sheet server 555, e.g., failing to complete consent to a carrier service agreement, or prior to receipt of the JS callback from the carrier web-sheet server 555. When the target device 150 crashes during the eSIM transfer process before completion of interaction with the web-sheet server 555, the target device 150 can allow for subsequent reconnection to the carrier web-sheet server 555 to complete the interaction required for authorization to download the profile (eSIM).

Figure 5D:
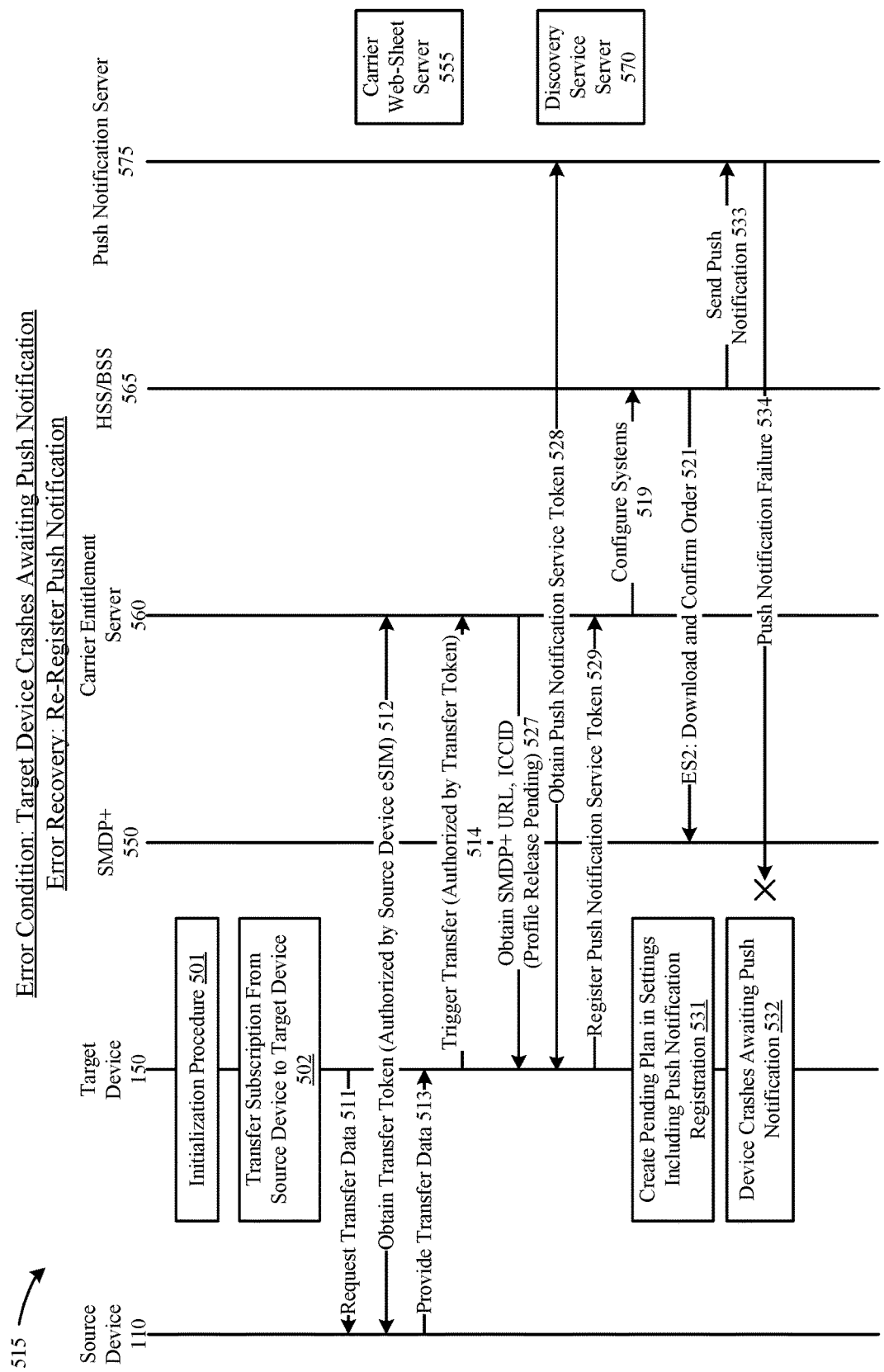
Figure 5E:
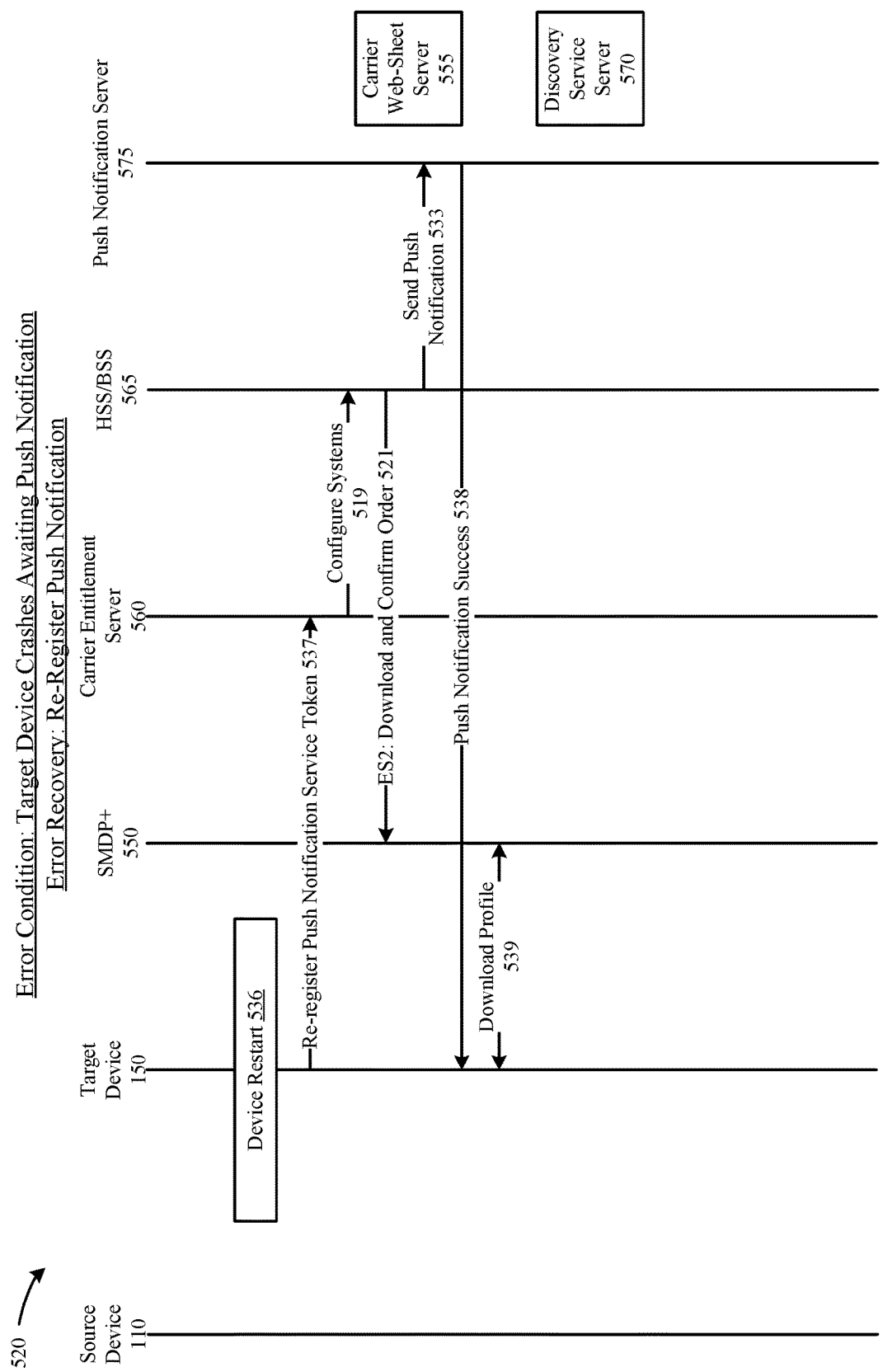

FIGS. 5D and 5E illustrate diagrams 515, 520 that indicate exemplary error recovery actions to take when transfer of an eSIM is incomplete due to the target device 150 missing a push notification from a push notification server 575, such as when the target device 150 crashes or the user inadvertently or intentionally exits the transfer process prematurely. As discussed herein, propagation via carrier back-end systems, for assignment and provisioning of an eSIM from the source device 110 to the target device 150, can be time consuming. In some cases, the target device 150 registers with a third-party managed push notification server 575 to receive a push notification to trigger download of the eSIM. When eSIM provisioning by the carrier's back-end systems is complete, the carrier entitlement server 560 can trigger the push notification server 575 to send a push notification to the target device 150. In some error conditions, the target device 150 can miss receipt of the push notification from the push notification server 575, e.g., due to a crash or restart of the target device 150 after which the target device 150 may not automatically re-register for the push notification. From the perspective of the push notification server 575, the push notification was sent to the target device 150, but from the perspective of the target device 150, the push notification was not received. The target device 150 will not download the eSIM without receipt of the push notification. To recover from such an error condition, the target device 150 can store (cache) information for push notification registration to re-use upon restart of the target device 150 to re-register (or register for a first time if not already done) with the push notification server 575 for the push notification.

As shown in FIG. 5D, the target device 150, at 501, can perform an initialization (setup) procedure and, at 502, initiate transfer of an eSIM (plan, subscription) from the source device 110 to the target device 150. The target device 150, at 511, can request transfer data from the source device 110, where the transfer data to transfer the eSIM can include a transfer token obtained by the source device 110. The source device 110, at 512, can obtain the transfer token from the carrier entitlement server 560, where authorization for transfer of the eSIM can be based at least in part on the source device 110 having the eSIM (installed and operational). The source device 110, at 513, can provide transfer data to the target device 150 including the transfer token. The target device 150, at 514, can subsequently trigger transfer of the eSIM by interacting with the carrier entitlement server 560, where authorization is provided based on the target device 150 having the transfer token previously provided to the source device 110 by the carrier entitlement server 560. The target device 150 obtains from the carrier entitlement server 560, at 527, a web address (URL) for the SMDP+ 550 from which to download the profile for the transferred eSIM and an ICCID to associate with the (to be downloaded) profile. The carrier entitlement server 560, at 527, can also indicate to the target device 150 that release of the profile (eSIM) for download to the target device 150 from the SMDP+ 550 is pending and should be triggered based on receipt of a push notification from the push notification server 575. The target device 150, at 528, can obtain a push notification service token from the push notification server 575 and subsequently, at 529, register the push notification service token with the carrier entitlement server 560. The target device 150, at 531, can also create a pending plan in the carrier settings including information for the push notification registration. After receipt of push notification service token from the target device 150 at 529, the carrier entitlement server 560, at 519, initiates the back-end transfer process including configuring the HSS/BSS 565, which confirms, at 521, a download order using an ES2+ message to the SMDP+ 550. The back-end HSS/BSS 565 can subsequently send, at 533, a message to the push notification server 575 to cause the push notification server to send, at 534, a push notification to the target device 150. As shown in FIG. 5D, however, the target device 150 may crash, at 532, awaiting receipt of the push notification from the push notification server 575, in which case a push notification failure occurs at 534.

As shown in FIG. 5E, following a restart at 536, the target device 150, at 537, can re-register the push notification service token, previously obtained from the push notification server 575 (and stored with the pending plan information), with the carrier entitlement server 560, which can complete back-end authorization for transfer of the eSIM at 519, 521 (if not already previously completed). The back-end HSS/BSS 565, at 533, can re-trigger the push notification server 575 to re-send the push notification, at 528, which is successfully received by the target device 150 and which causes the target device 150 to download the eSIM (profile) successfully from the SMDP+ 550 at 539.

Figure 5F:
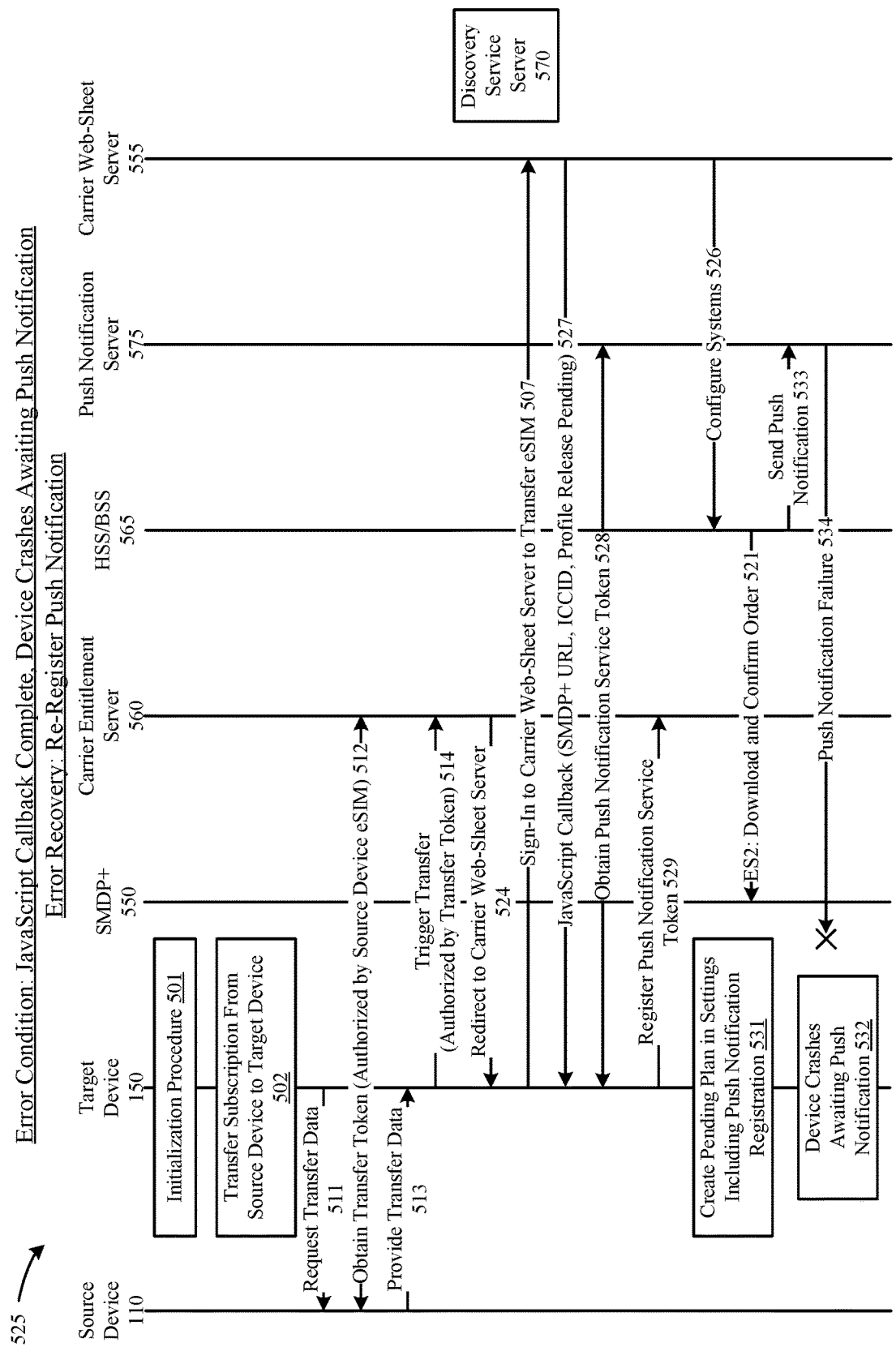
Figure 5G:
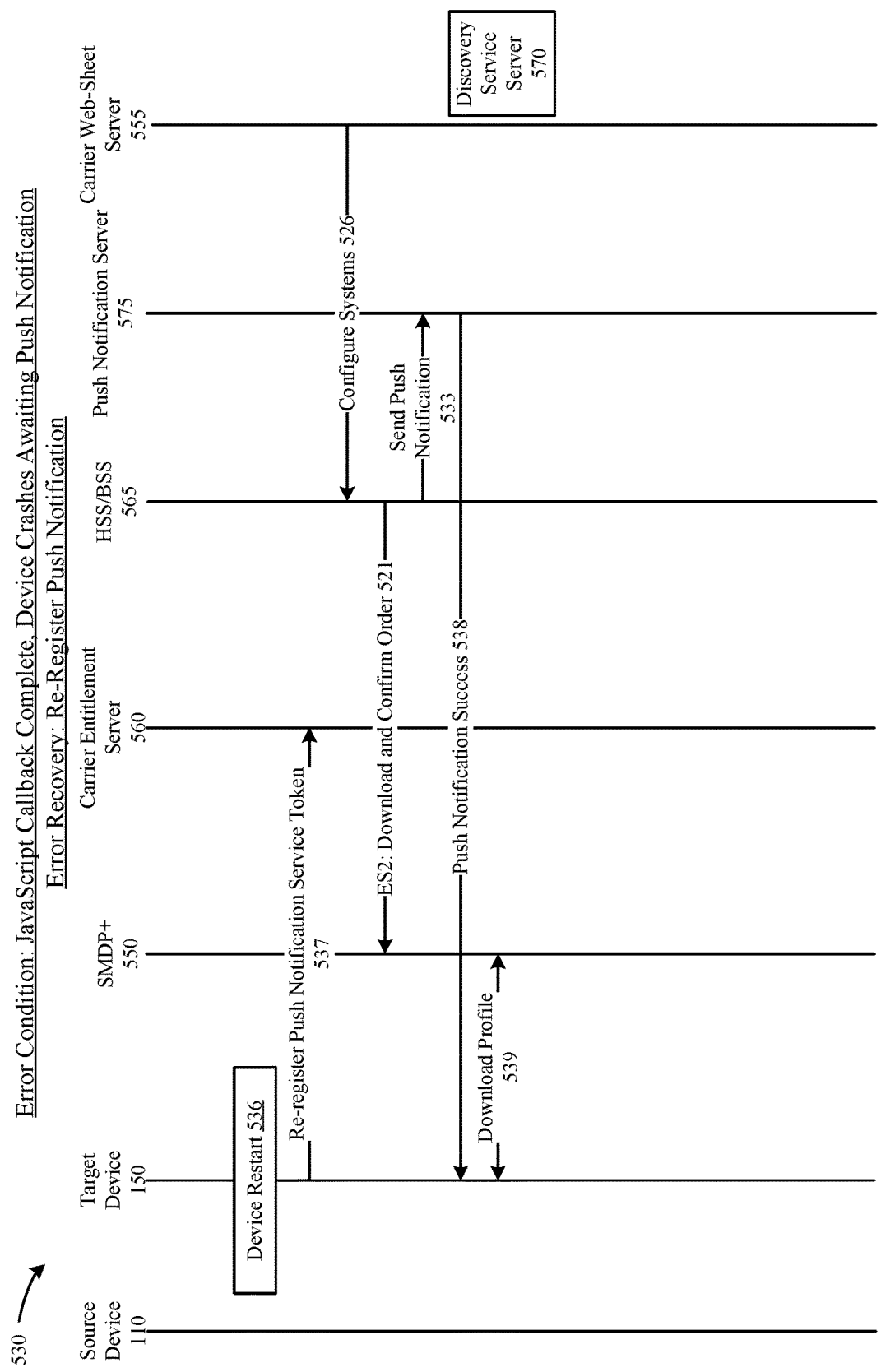

FIGS. 5F and 5G illustrate diagrams 525, 530 that indicate exemplary error recovery actions to take in another scenario where transfer of an eSIM is incomplete due to the target device 150 missing a push notification from the push notification server 575, such as when the target device 150 crashes or the user inadvertently or intentionally exits the transfer process prematurely. As with the scenario illustrated in FIGS. 5D and 5E, the target device 150 registers for a push notification but crashes while awaiting receipt of the push notification from the push notification server 575.

As shown in FIG. 5F, the target device 150, at 501, can perform an initialization (setup) procedure and, at 502, initiate transfer of an eSIM (plan, subscription) from the source device 110 to the target device 150. The target device 150, at 511, can request transfer data from the source device 110, where the transfer data to transfer the eSIM can include a transfer token obtained by the source device 110. The source device 110, at 512, can obtain a transfer token from the carrier entitlement server 560, where authorization for transfer of the eSIM can be based at least in part on the source device 110 having the eSIM (installed and operational). The source device 110, at 513, can provide transfer data to the target device 150 including the transfer token. The target device 150, at 514, can subsequently trigger transfer of the eSIM by interacting with the carrier entitlement server 560, where authorization is provided based on the target device 150 having the transfer token previously provided to the source device 110 by the carrier entitlement server 560. In FIG. 5F, at 524, the target device 150 is directed to a carrier web-sheet server 555 by the carrier entitlement server 560 as part of the process to authorize transfer of the eSIM. The target device 150 can be re-directed to the carrier's web-sheet server 555 for various reasons, including based on a policy of the carrier and/or for additional security to authorize transfer of the eSIM from the source device 110 to the target device 150. The target device 150, at 507, can interact with the carrier web-sheet server 555 by providing user credentials as required to indicate authorization for transfer of the eSIM. Upon successful authorization, the carrier web-sheet server 555, at 527, can initiate a JavaScript callback to establish a secure connection with the target device 150 and provide a web address (URL) for the SMDP+ 550 from which to download the eSIM. The carrier web-sheet server 555, at 527, can also provide an ICCID to be associated with the eSIM to be downloaded to the target device 150. The carrier web-sheet server 555, at 527, can additionally provide an indication that release of the profile (eSIM) for download from the SMDP+ 550 is pending and should be triggered based on receipt of a push notification from the push notification server 575. The target device 150, at 528, can obtain a push notification service token from the push notification server 575 and, at 529, register the push notification service token with the carrier entitlement server 560. The target device 150, at 531, can also create a pending plan in the carrier settings including information for the push notification registration. After successful authorization and completion of the JS callback to the target device 150, the carrier web-sheet server 555 can initiate the back-end transfer process including, at 526, configuring the HSS/BSS 565, which confirms a download order, at 521, using an ES2+ message to the SMDP+ 550. The HSS/BSS 565, at 533, can subsequently send a message to the push notification server 575 to cause the push notification server to send a push notification to the target device 150 at 534. The target device 150, however, may crash awaiting receipt of the push notification from the push notification server 575 for reasons similar to those discussed for FIG. 5D and therefore the push notification at 534 fails to be received by the target device 150.

As shown in FIG. 5G, following a restart at 536, the target device 150 can re-register, at 537, the push notification service token, previously obtained from the push notification server 575 (and stored with the pending plan information), with the carrier entitlement server 560. The carrier web-sheet server 555, at 526, can complete back-end authorization for transfer of the eSIM (if not already previously completed). The HSS/BSS 565, at 533, can re-trigger the push notification server 575 to re-send the push notification at 538, which is successfully received by the target device 150, at 538, and which causes the target device 150, at 539, to download the eSIM (profile) from the SMDP+ 550.

For any of the error scenarios in which the target device 150 is awaiting a push notification, details of the push notification service can be stored for subsequent re-use by the target device 150 should an additional push notification service token be required. A pending plan can be indicated in the carrier settings menu to provide feedback to a user of the target device 150 that installation of a profile (eSIM) has not completed and that a pending action, e.g., a push notification is still required to complete download and installation of the profile (eSIM). In some cases, when the target device 150 is unable to download the profile (eSIM) from the particular SMDP+ 550 specified in the transfer response, the target device 150 can fallback and attempt to download the profile (eSIM) from a default SMDP+ 550 for which an internet address (URL) can be pre-stored in the target device 150, such as via a carrier bundle. Pending plans are not cleared until a successful profile (eSIM) installation corresponding to the pending plan occurs or until the user indicates that the pending plan should be removed.

Figure 5H:
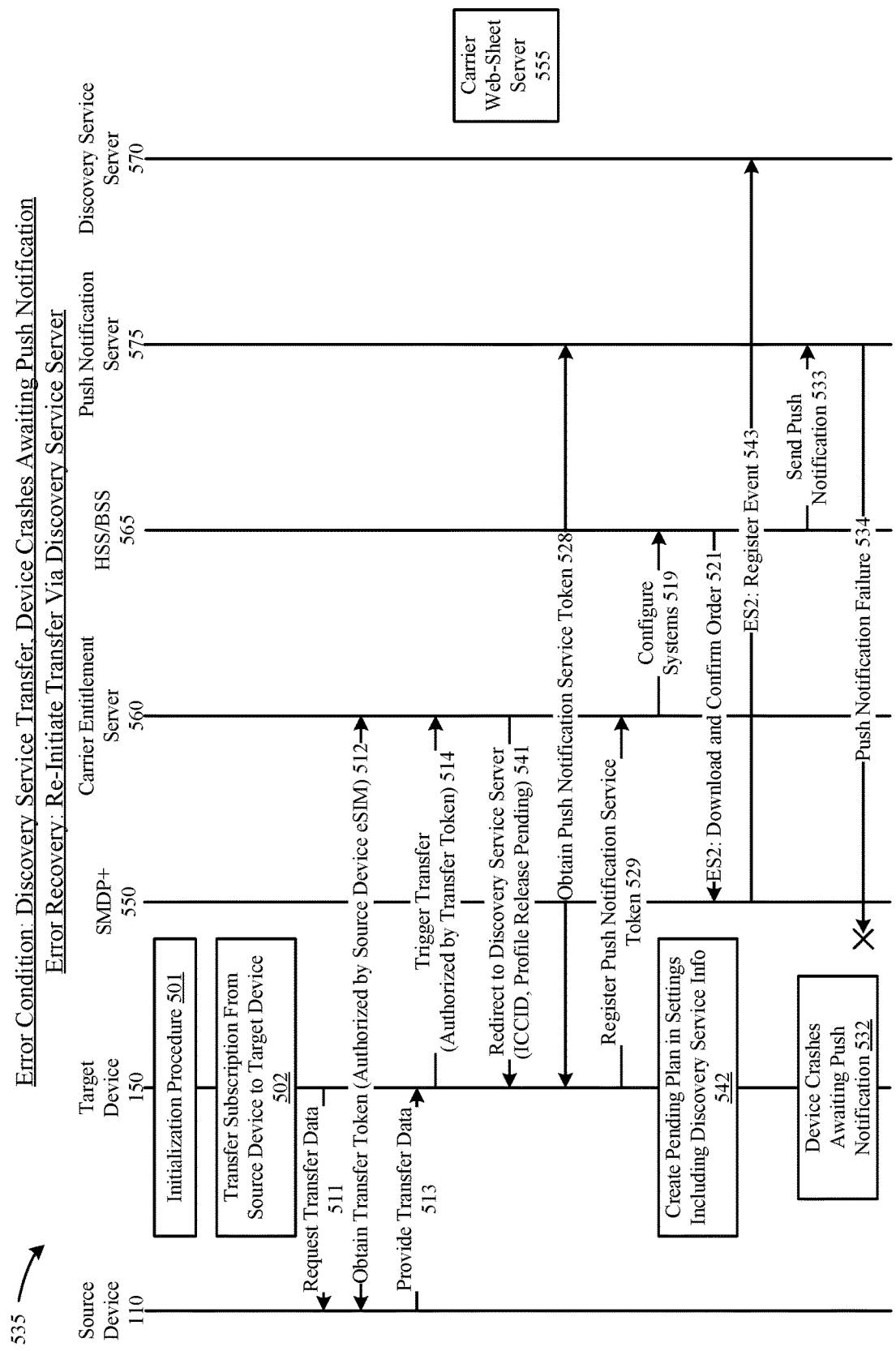
Figure 5I:
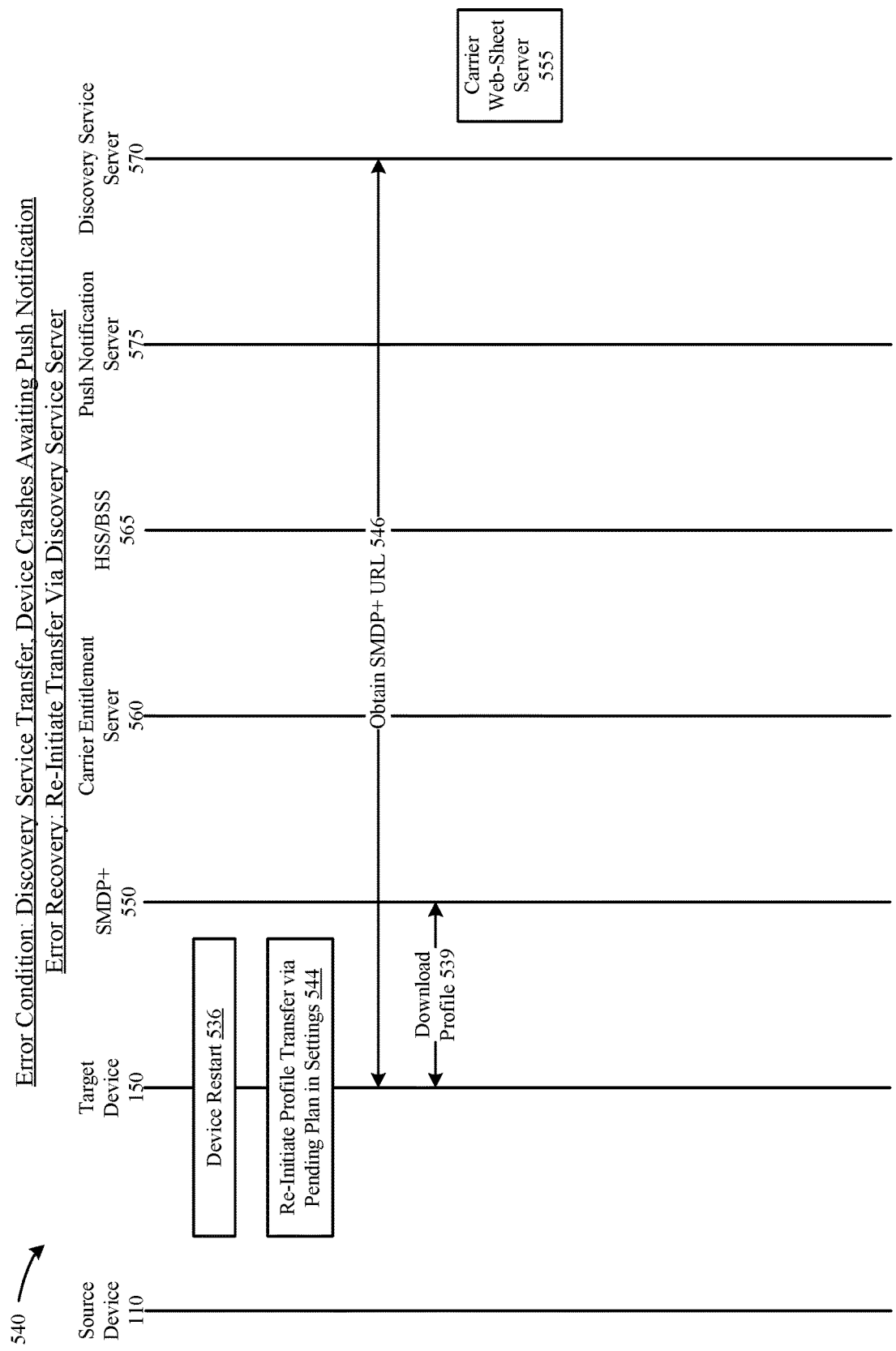

FIGS. 5H and 5I illustrate diagrams 535, 540 that indicate exemplary error recovery actions to take in a further scenario when transfer of an eSIM is incomplete due to the target device 150 missing a push notification from the push notification server 575, such as when the target device 150 crashes or the user inadvertently or intentionally exits the transfer process prematurely. As with the scenarios illustrated in FIGS. 5D, 5E, 5F, and 5G, the target device 150 registers for a push notification but crashes while awaiting receipt of the push notification from the push notification server 575. The scenario illustrated in FIGS. 5H and 5I further involve a discovery service server 570 that participates in the transfer of the profile (eSIM) from the source device 110 to the target device 150. A carrier (MNO) can use a third-party discovery service (lookup) server 570 as well as a third-party service push notification server 575 as part of the process to transfer an eSIM to the target device 150. The carrier entitlement server 560 can re-direct the target device 150 to obtain an SMDP+ 550 internet address (URL) from the discovery service server 570, where the URL is obtained only after receipt of a push notification by the target device 150 from the push notification server 575. Notably, in the scenario illustrated in FIGS. 5H and 5I, the carrier entitlement server 560 does not provide the SMDP+ URL to the target device 150 and instead redirects the target device 150 to the discovery service server 570. When the target device 150 does not receive the push notification from the push notification server 575, the target device 150 can recover from the error condition by re-initiating transfer of the profile (eSIM) by interacting with the discovery service server 570.

As shown in FIG. 5H, the target device 150, at 501, can perform an initialization (setup) procedure and, at 502, initiate transfer of an eSIM (plan, subscription) from the source device 110 to the target device 150. The target device 150, at 511, can request transfer data from the source device 110, where the transfer data to transfer the eSIM can include a transfer token obtained by the source device 110. The source device 110, at 512, can obtain a transfer token from the carrier entitlement server 560, where authorization for transfer of the eSIM can be based at least in part on the source device 110 having the eSIM (installed and operational). The source device 110, at 513, can provide transfer data to the target device 150 including the transfer token. The target device 150, at 514, can subsequently trigger transfer of the eSIM by interacting with the carrier entitlement server 560, where authorization is provided based on the target device 150 having the transfer token previously provided to the source device 110 by the carrier entitlement server 560. In FIG. 5H, the target device 150, at 541, is directed to a discovery service server 570 by the carrier entitlement server 560 as part of the process to transfer the eSIM. The carrier entitlement server 560, at 541, can provide an ICCID to be associated with the eSIM to be downloaded to the target device 150. The carrier entitlement server 560, at 541, can additionally provide an indication that release of the profile (eSIM) for download from the SMDP+ 550 is pending and should be triggered based on receipt of a push notification from the push notification server 575. With this indication, the target device 150 waits for the push notification before attempting to download the profile (eSIM) from the SMDP+ 550. The target device 150, at 528, can obtain a push notification service token from the push notification server 575 and, at 529, register the push notification service token with the carrier entitlement server 560. The target device 150, at 542, can also create a pending plan in the carrier settings and store information for the discovery service server 570. The carrier entitlement server 560, at 519, initiates the back-end transfer process including configuring the HSS/BSS 565, which confirms a download order, at 521, by sending an ES2+ message to the SMDP+ 550. The HSS/BSS 565, at 533, can subsequently send a message to the push notification server 575 to cause the push notification server 575, at 534, to send a push notification to the target device 150. The target device 150 may crash while waiting to receive the push notification from the push notification server 575, which can result in the indicated push notification failure at 534.

As shown in FIG. 5I, following a restart at 536, the target device 150, at 544, can re-initiate transfer of the profile (eSIM) for the pending plan as indicated in the carrier settings menu. The target device 150, at 544, can retrieve information for the discovery service server 570 previously stored for the pending plan and obtain, at 546, from the discovery service server 570 an internet address (URL) for the SMDP+ 550 from which to download the profile (eSIM). The target device 150, at 539, can directly download the profile (eSIM) from the SMDP+ 550 following the restart without requiring additional interaction with the carrier entitlement server 560 or with the push notification server 575.

In some scenarios, error recovery can occur without requiring user interaction to trigger download of an eSIM (profile) to the target device 150 (or to complete transfer of pending plan). As data connectivity interruptions and data loss can occur during an eSIM (profile) installation attempt, automatic retries can allow for re-attempting download of an eSIM without waiting for a user input to clear a pending plan. In some scenarios, telephony software on the target device 150 monitors for availability of data connectivity as well as indications of a pending data plan and performs actions to download the eSIM (profile) to the target device 150 automatically based on previously stored and/or pre-stored information.

Representative Exemplary Apparatus

Figure 6:
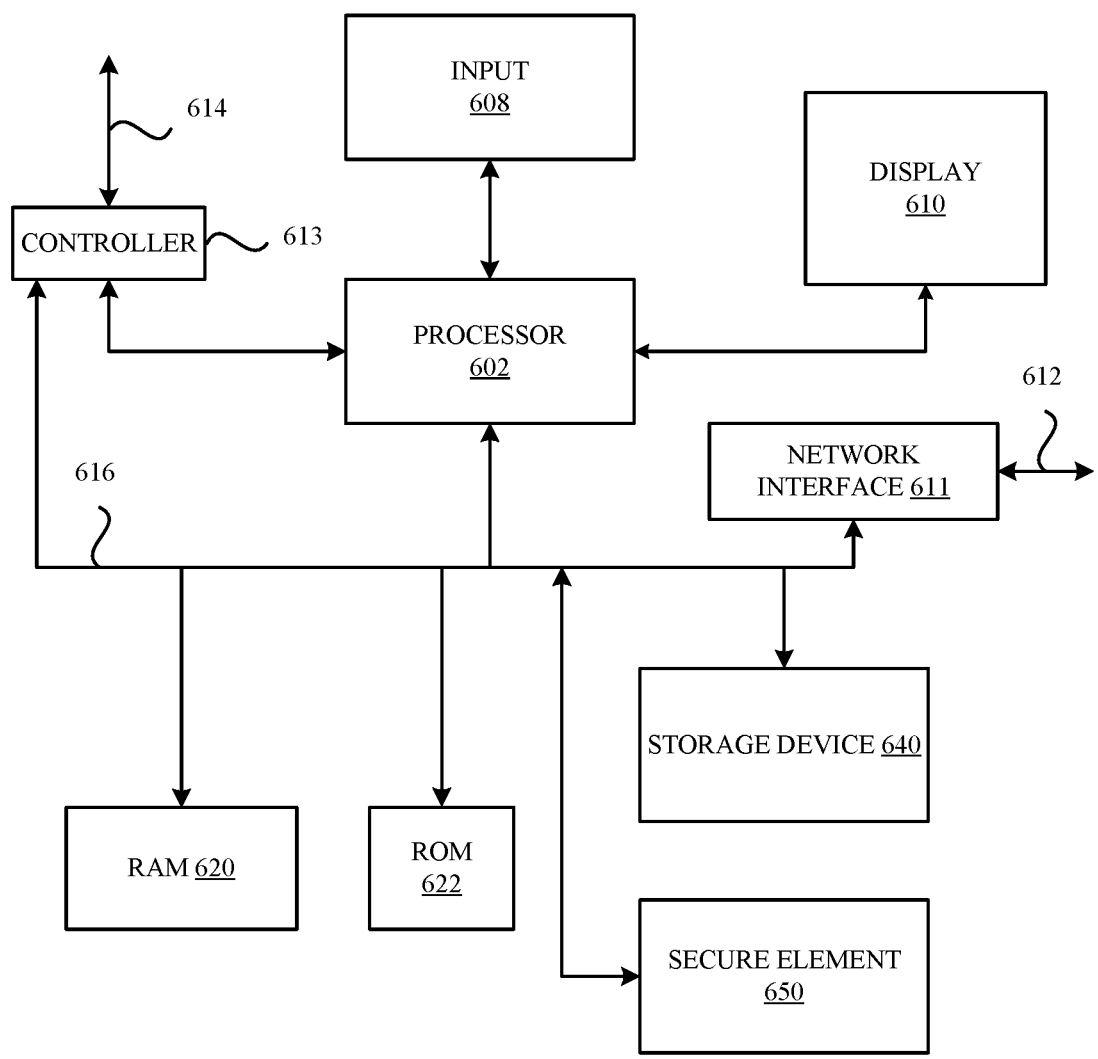
FIG. 6 illustrates a block diagram of exemplary elements of a mobile wireless device, according to some embodiments.

FIG. 6 illustrates in block diagram format an exemplary computing device 600 that can be used to implement the various components and techniques described herein, according to some embodiments. In particular, the detailed view of the exemplary computing device 600 illustrates various components that can be included in the source device 110 and/or the target device 150. As shown in FIG. 6, the computing device 600 can include a processor 602 that represents a microprocessor or controller for controlling the overall operation of computing device 600. In some embodiments, the computing device 600 can also include a user input device 608 that allows a user of the computing device 600 to interact with the computing device 600. For example, in some embodiments, the user input device 608 can take a variety of forms, such as a button, keypad, dial, touch screen, audio input interface, visual/image capture input interface, input in the form of sensor data, etc. In some embodiments, the computing device 600 can include a display 610 (screen display) that can be controlled by the processor 602 to display information to the user (for example, information relating to incoming, outgoing, or active communication session). A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include wireless circuitry, such as a wireless transceiver and/or baseband processor. The computing device 600 can also include a secure element 650. The secure element 650 can include an eUICC 114 and/or UICC 104.

The computing device 600 also includes a storage device 640, which can include a single storage or a plurality of storages (e.g., hard drives, memory modules), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

Representative Embodiments

In some embodiments, a method for cellular service account transfer error recovery by a target device includes: initiating transfer of an electronic subscriber identity module (eSIM) from a source device to the target device; obtaining data required for transfer of the eSIM from the source device; storing at least a portion of the data required for transfer of the eSIM in the target device; incurring an error while attempting or waiting to download the eSIM to the target device; and reusing the at least a portion of the data subsequently to download and install the eSIM to the target device from a mobile network operator (MNO) provisioning server, where the target device and the source device are associated with a common user account.

In some embodiments, the at least a portion of the data includes an integrated circuit card identifier (ICCID) for the eSIM on the source device. In some embodiments, the at least a portion of the data includes an ICCID for the eSIM to be downloaded to the target device. In some embodiments, the at least a portion of the data includes a network address for the MNO provisioning server from which to download the eSIM to the target device. In some embodiments, the method further includes the target device storing a pending plan state for the eSIM prior to attempting to download the eSIM. In some embodiments, the pending plan state for the eSIM includes an indication that transfer of the eSIM requires interaction by the target device with an MNO web-sheet server, and the method further includes the target device re-registering a push notification service token with a push notification server after incurring the error while waiting to download the eSIM. In some embodiments, the pending plan state for the eSIM includes information for accessing a discovery service server, and the method further includes the target device obtaining a network address for the MNO provisioning server from the discovery service server. In some embodiments, the error incurred by the target device includes an inadvertent or forced restart of the target device. In some embodiments, the error incurred by the target device includes a failure to receive a push notification from a push notification server.

In some embodiments, an apparatus configurable for operation in a target device includes one or more processors and at least one memory communicatively coupled to the one or more processors and storing instructions that, when executed by the one or more processors causes the target device to perform actions including: initiating transfer of an electronic subscriber identity module (eSIM) from a source device to the target device; obtaining data required for transfer of the eSIM from the source device; storing at least a portion of the data required for transfer of the eSIM in the target device; incurring an error while attempting or waiting to download the eSIM to the target device; and reusing the at least a portion of the data subsequently to download and install the eSIM to the target device from a mobile network operator (MNO) provisioning server, where the target device and the source device are associated with a common user account.

In some embodiments, the actions further include storing, at the target device, a pending plan state for the eSIM prior to attempting to download the eSIM. In some embodiments, the pending plan state for the eSIM includes an indication that transfer of the eSIM requires interaction by the target device with an MNO web-sheet server, and the actions further include the target device providing credentials to the web-sheet server to prove authority to transfer the eSIM from the source device to the target device. In some embodiments, the pending plan state for the eSIM includes an indication that a push notification is pending, the push notification indicating that the eSIM is downloadable to the target device, and the actions further include the target device re-registering a push notification service token with a push notification server after incurring the error while waiting to download the eSIM. In some embodiments, the pending plan state for the eSIM includes information for accessing a discovery service server, and the actions further include the target device obtaining a network address for the MNO provisioning server from the discovery service server.

In some embodiments, a target device configurable for cellular service account transfer error recovery includes one or more antennas; and wireless circuitry communicatively coupled to the one or more antennas and including one or more processors and memory storing instructions that, when executed by the one or more processors, causes the target device to perform actions including: initiating transfer of an electronic subscriber identity module (eSIM) from a source device to the target device; obtaining data required for transfer of the eSIM from the source device; storing at least a portion of the data required for transfer of the eSIM in the target device; incurring an error while attempting or waiting to download the eSIM to the target device; and reusing the at least a portion of the data subsequently to download and install the eSIM to the target device from a mobile network operator (MNO) provisioning server, where the target device and the source device are associated with a common user account.

In some embodiments, the actions further include storing, at the target device, a pending plan state for the eSIM prior to attempting to download the eSIM. In some embodiments, the pending plan state for the eSIM includes an indication that transfer of the eSIM requires interaction by the target device with an MNO web-sheet server, and the actions further include providing, by the target device, credentials to the web-sheet server to prove authority to transfer the eSIM from the source device to the target device. In some embodiments, the pending plan state for the eSIM includes an indication that a push notification is pending, the push notification indicating that the eSIM is downloadable to the target device, and the actions further include re-registering, by the target device, a push notification service token with a push notification server after incurring the error while waiting to download the eSIM. In some embodiments, the pending plan state for the eSIM includes information for accessing a discovery service server, and the actions further include obtaining, by the target device, a network address for the MNO provisioning server from the discovery service server.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for cellular service account transfer error recovery, the method comprising:
by a target device:
initiating transfer of an electronic subscriber identity module (eSIM) from a source device to the target device;
obtaining, from a mobile network operator (MNO) entitlement server or an MNO web-sheet server, data required for subsequent transfer of the eSIM from the source device to the target device;
storing, in the target device, at least a portion of the data required for transfer of the eSIM;
after storing the at least a portion of the data, incurring an error while attempting or waiting to download the eSIM to the target device; and
reusing the at least a portion of the data subsequently to download and install the eSIM to the target device from an MNO provisioning server,
wherein the target device and the source device are associated with a common user account.

2. The method of claim 1, wherein the at least a portion of the data comprises an integrated circuit card identifier (ICCID) for the eSIM on the source device.

3. The method of claim 1, wherein the at least a portion of the data comprises an ICCID for the eSIM to be downloaded to the target device.

4. The method of claim 1, wherein the at least a portion of the data comprises a network address for the MNO provisioning server from which to download the eSIM to the target device.

5. The method of claim 1, further comprising:
by the target device:
storing, in a memory of the target device, a pending plan state for the eSIM to be transferred from the source device to the target device prior to attempting to download the eSIM.

6. The method of claim 5, wherein:
the pending plan state for the eSIM comprises an indication that transfer of the eSIM requires interaction by the target device with an MNO web-sheet server; and
the method further comprises providing, by the target device, credentials to the web-sheet server to prove authority to transfer the eSIM from the source device to the target device.

7. The method of claim 5, wherein:
the pending plan state for the eSIM comprises an indication that a push notification is pending, the push notification indicating that the eSIM is downloadable to the target device; and
the method further comprises re-registering, by the target device, a push notification service token with a push notification server after incurring the error while waiting to download the eSIM.

8. The method of claim 5, wherein:
the pending plan state for the eSIM comprises information for accessing a discovery service server; and
the method further comprises obtaining, la the target device, a network address for the MNO provisioning server from the discovery service server.

9. The method of claim 1, wherein the error incurred by the target device comprises an inadvertent or forced restart of the target device.

10. The method of claim 1, wherein the error incurred by the target device comprises a failure to receive a push notification from a push notification server.

11. An apparatus configurable for operation in a target device, the apparatus comprising:
one or more processors; and
at least one memory communicatively coupled to the one or more processors and storing instructions that, when executed by the one or more processors causes the target device to perform actions including:
initiating transfer of an electronic subscriber identity module (eSIM) from a source device to the target device;
obtaining, from a mobile network operator (MNO) entitlement server or an MNO web-sheet server, data required for subsequent transfer of the eSIM from the source device to the target device;
storing, in the at least one memory of the target device, at least a portion of the data required for transfer of the eSIM;
after storing the at least a portion of the data, incurring an error while attempting or waiting to download the eSIM to the target device; and
reusing the at least a portion of the data subsequently to download and install the eSIM to the target device from an MNO provisioning server,
wherein the target device and the source device are associated with a common user account.

12. The apparatus of claim 11, wherein the actions further comprise storing, in the at least one memory of the target device, a pending plan state for the eSIM to be transferred from the source device to the target device prior to attempting to download the eSIM.

13. The apparatus of claim 12, wherein:
the pending plan state for the eSIM comprises an indication that transfer of the eSIM requires interaction by the target device with an MNO web-sheet server; and
the actions further comprise providing, by the target device, credentials to the web-sheet server to prove authority to transfer the eSIM from the source device to the target device.

14. The apparatus of claim 12, wherein:
the pending plan state for the eSIM comprises an indication that a push notification is pending, the push notification indicating that the eSIM is downloadable to the target device; and
the actions further comprise re-registering, by the target device, a push notification service token with a push notification server after incurring the error while waiting to download the eSIM.

15. The apparatus of claim 12, wherein:
the pending plan state for the eSIM comprises information for accessing a discovery service server; and
the actions further comprise obtaining, la the target device, a network address for the MNO provisioning server from the discovery service server.

16. A target device configurable for cellular service account transfer error recovery, the target device comprising:
one or more antennas; and
wireless circuitry communicatively coupled to the one or more antennas and comprising one or more processors and memory storing instructions that, when executed by the one or more processors, causes the target device to perform actions including:
initiating transfer of an electronic subscriber identity module (eSIM) from a source device to the target device;
obtaining, from a mobile network operator (MNO) entitlement server or an MNO web-sheet server, data required for transfer of the eSIM from the source device;
storing, in the target device, at least a portion of the data required for transfer of the eSIM;
after storing the at least a portion of the data, incurring an error while attempting or waiting to download the eSIM to the target device; and
reusing the at least a portion of the data subsequently to download and install the eSIM to the target device from an MNO provisioning server,
wherein the target device and the source device are associated with a common user account.

17. The target device of claim 16, wherein the actions further comprise storing, in the memory of the target device, a pending plan state for the eSIM to be transferred from the source device to the target device prior to attempting to download the eSIM.

18. The target device of claim 17, wherein:
the pending plan state for the eSIM comprises an indication that transfer of the eSIM requires interaction by the target device with an MNO web-sheet server; and
the actions further comprise providing, by the target device, credentials to the web-sheet server to prove authority to transfer the eSIM from the source device to the target device.

19. The target device of claim 17, wherein:
the pending plan state for the eSIM comprises an indication that a push notification is pending, the push notification indicating that the eSIM is downloadable to the target device; and
the actions further comprise re-registering, by the target device, a push notification service token with a push notification server after incurring the error while waiting to download the eSIM.

20. The target device of claim 17, wherein:
the pending plan state for the eSIM comprises information for accessing a discovery service server; and
the actions further comprise obtaining, by the target device, a network address for the MNO provisioning server from the discovery service server.

* * * * *

UNITED STATES PATENT AND TRADEMARK OFFICE
CERTIFICATE OF CORRECTION

| | | |
|---|---|---|
| PATENT NO. | : 11,012,852 B2 | |
| APPLICATION NO. | : 16/667634 | |
| DATED | : May 18, 2021 | |
| INVENTOR(S) | : Chaugule et al. | |

It is certified that error appears in the above-identified patent and that said Letters Patent is hereby corrected as shown below:

In the Specification

In Column 11, Line 12 to 33 Delete: "Error recovery mechanisms, when failure to download an eSIM from the SMDP+ 550 occurs as shown in FIG. 5C, can also be used when the target device 150 crashes during an eSIM transfer process. A crash of the target device 150 can occur: (i) after receipt of a response from the carrier entitlement server 560 (FIG. 5B), (ii) after receipt of a JS callback from the carrier web-sheet server 555 (FIG. 5C), (iii) due to a web-sheet user interface (UI) crash after receipt of the JS callback from the carrier web-sheet server 555, (iii) due to reboot of the target device 150 while downloading the profile from the SMDP+ 550, (iv) due to a user inadvertently or intentionally exits a web-sheet user interface (UI) during interaction with the carrier web-sheet server 555, e.g., failing to complete consent to a carrier service agreement, or prior to receipt of the JS callback from the carrier web-sheet server 555. When the target device 150 crashes during the eSIM transfer process before completion of interaction with the web-sheet server 555, the target device 150 can allow for subsequent reconnection to the carrier web-sheet server 555 to complete the interaction required for authorization to download the profile (eSIM).".

In the Claims

In Claim 8, at Column 20, Line 62: "the method further comprises obtaining, la the target" should read -- the method further comprises obtaining, by the target --.

In Claim 15, at Column 21, Line 54: "the actions further comprise obtaining, la the target" should read -- the actions further comprise obtaining, by the target --.

Signed and Sealed this
Seventh Day of June, 2022

*Katherine Kelly Vidal*

Katherine Kelly Vidal
*Director of the United States Patent and Trademark Office*